US010696195B2

(12) United States Patent
Young et al.

(10) Patent No.: US 10,696,195 B2
(45) Date of Patent: Jun. 30, 2020

(54) SEAT WITH ENERGY ABSORBING SEATBACK

(71) Applicant: Key Safety Systems, Inc., Sterling Heights, MI (US)

(72) Inventors: Jeffrey Young, Bruce Township, MI (US); Tammy M Korona, Clinton Township, MI (US); John J Pollard, Imlay City, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/148,605

(22) Filed: Oct. 1, 2018

(65) Prior Publication Data

US 2019/0143855 A1    May 16, 2019

Related U.S. Application Data

(60) Provisional application No. 62/586,523, filed on Nov. 15, 2017.

(51) Int. Cl.
*B60N 2/42* (2006.01)
*B60N 2/427* (2006.01)

(52) U.S. Cl.
CPC ....... *B60N 2/42709* (2013.01); *B60N 2/4221* (2013.01)

(58) Field of Classification Search
CPC ............ B60N 2/42709; B60N 2/42772; B60N 2/42781; B60N 2/4221; B60N 2/4228; B60N 2/42745; B64D 11/0619

USPC .................................................... 297/216.14
See application file for complete search history.

(56) References Cited

U.S. PATENT DOCUMENTS

| 3,877,748 A | 4/1975 | Eggert |
| 4,040,660 A | 8/1977 | Barecki |
| 5,597,205 A * | 1/1997 | Glance .................. B60N 2/233 |
| | | 297/216.1 |
| 5,697,478 A | 12/1997 | DiStefano |
| 5,882,072 A | 3/1999 | Morlock |
| 6,074,004 A * | 6/2000 | Carmichael .......... B60N 2/4221 |
| | | 297/216.13 |
| 6,142,521 A | 11/2000 | Shephard |
| 6,382,717 B1 | 5/2002 | Yasui et al. |

(Continued)

FOREIGN PATENT DOCUMENTS

| JP | 5363147 | 12/2013 |
| WO | 9205072 | 4/1992 |

*Primary Examiner* — Mark R Wendell
(74) *Attorney, Agent, or Firm* — Meunier Carlin & Curfman LLC

(57) ABSTRACT

A seat having a seat frame with a seat back designed to prevent injuries to a rear occupant seated behind the seat as the rear occupant moves forward into the seat back during a frontal crash of a vehicle, the seat including a seat back frame part designed to support the back of any occupant but which can rotate during a crash as a rear occupant moves forward into the seat back, the invention including at least one energy absorbing assembly to control the rotary motion of the rotating seat frame part, the rotating frame part maintained in a non-rotating state by an articulating or breakable pin which when moved or broken permits the frame part to rotate as the rear occupant engages the seat frame in response to a frontal vehicular crash.

3 Claims, 6 Drawing Sheets

(56) References Cited

U.S. PATENT DOCUMENTS

| | | | |
|---|---|---|---|
| 6,568,753 B1 * | 5/2003 | Watanabe | B60N 2/42781 |
| | | | 297/216.12 |
| 7,059,675 B2 | 6/2006 | Nelson et al. | |
| 7,497,517 B2 | 3/2009 | Gundall et al. | |
| 8,246,112 B2 * | 8/2012 | Yasuda | B60N 2/4228 |
| | | | 297/216.12 |
| 8,348,003 B2 | 1/2013 | Kentaro et al. | |
| 2003/0213885 A1 * | 11/2003 | Schumann | B60N 2/1615 |
| | | | 248/419 |
| 2018/0222361 A1 * | 8/2018 | Murray | B60N 2/4221 |

* cited by examiner

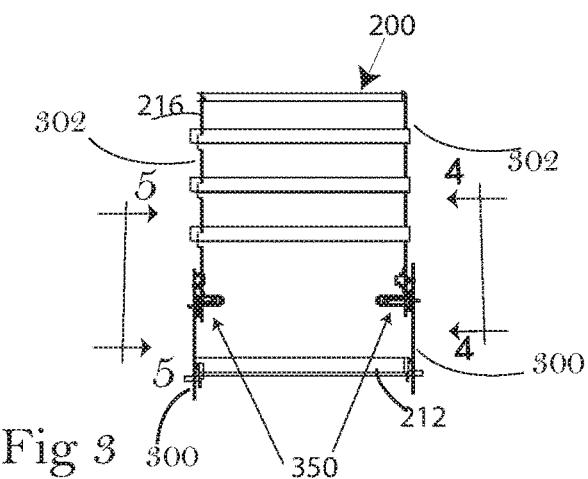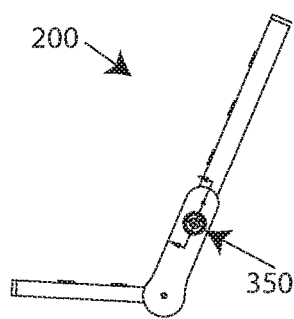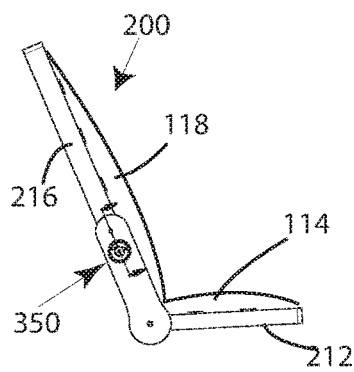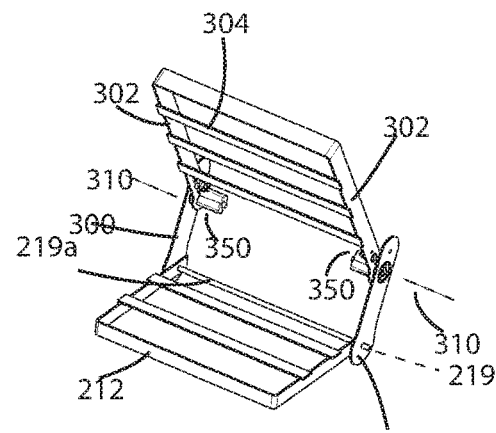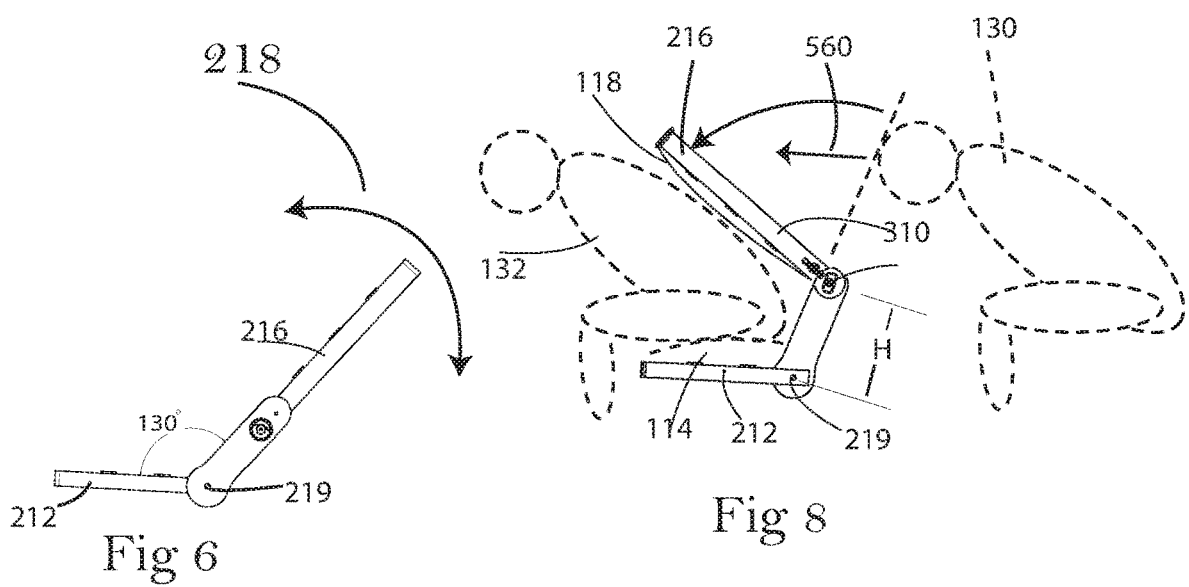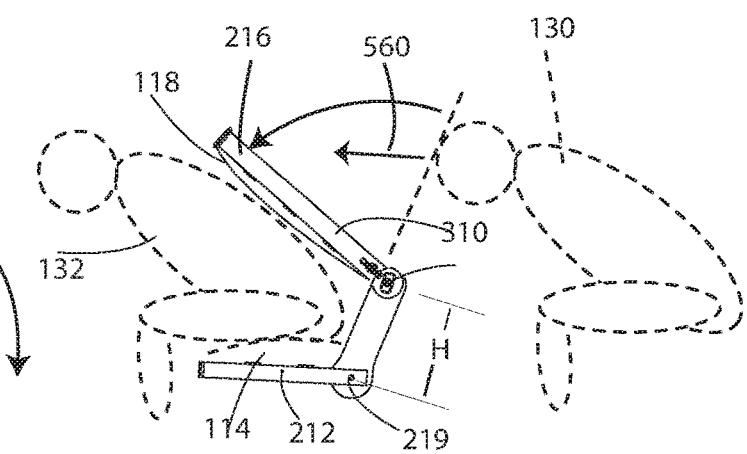

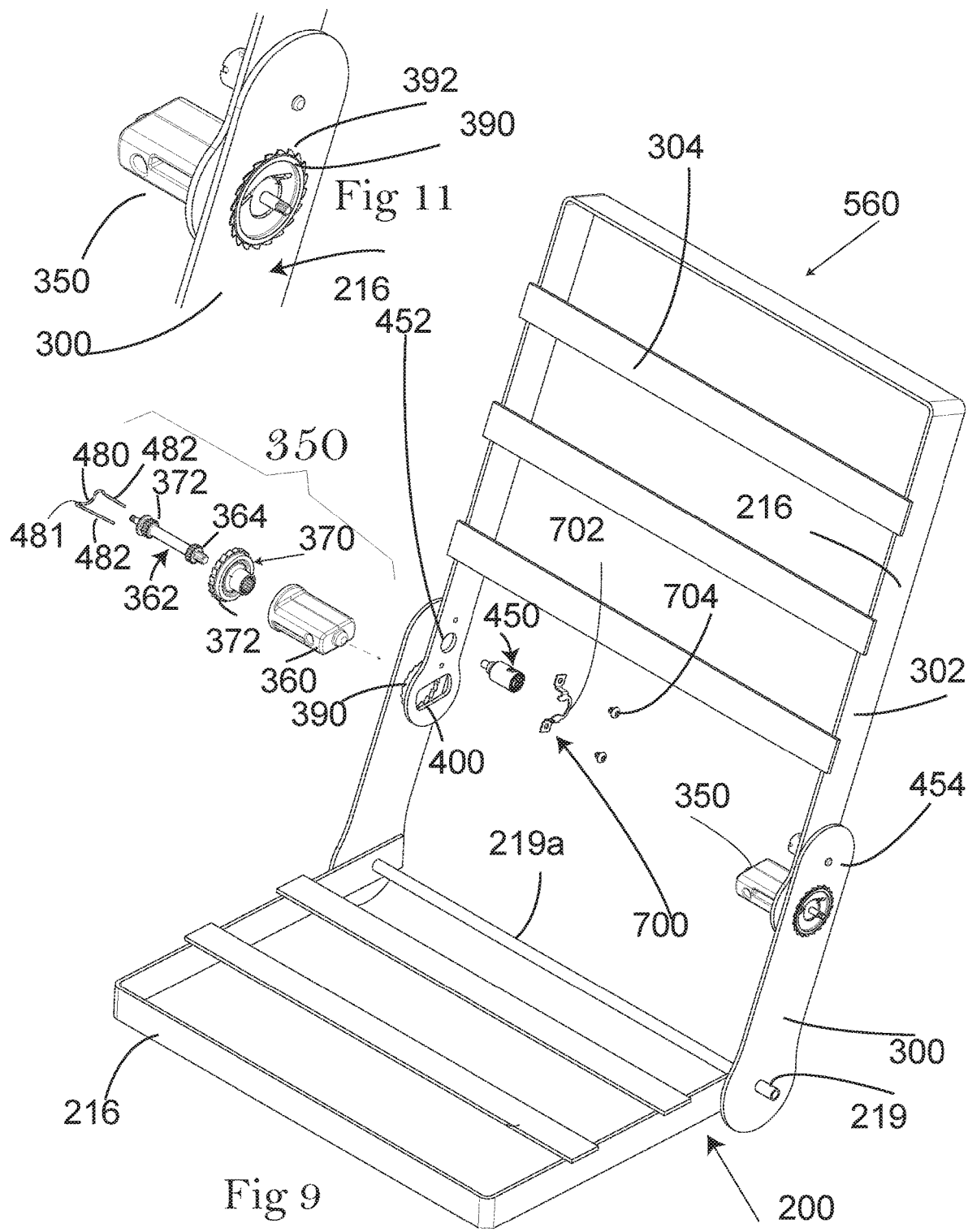

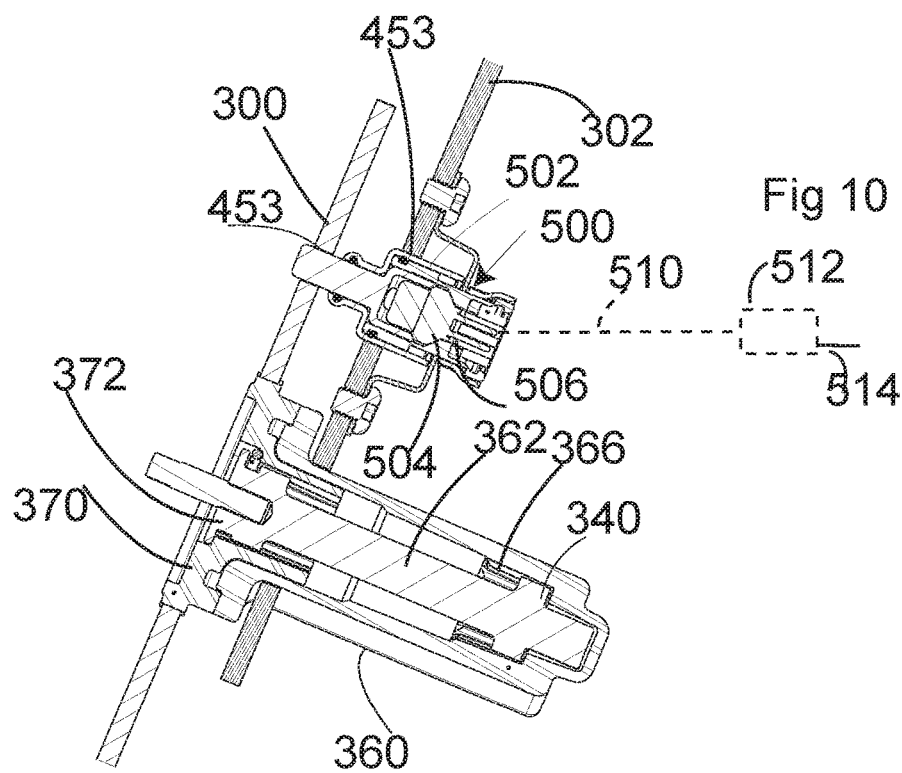
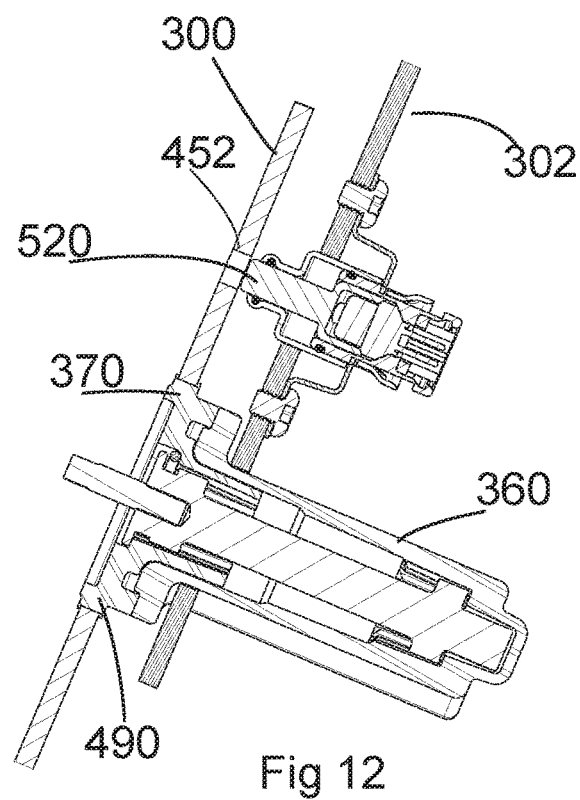
Fig 12

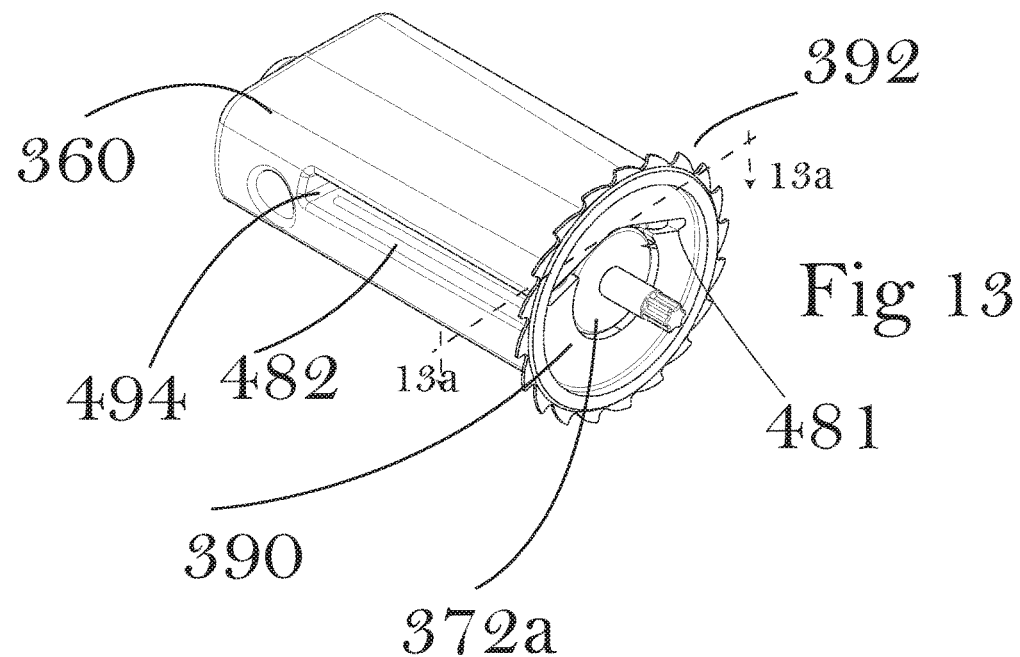
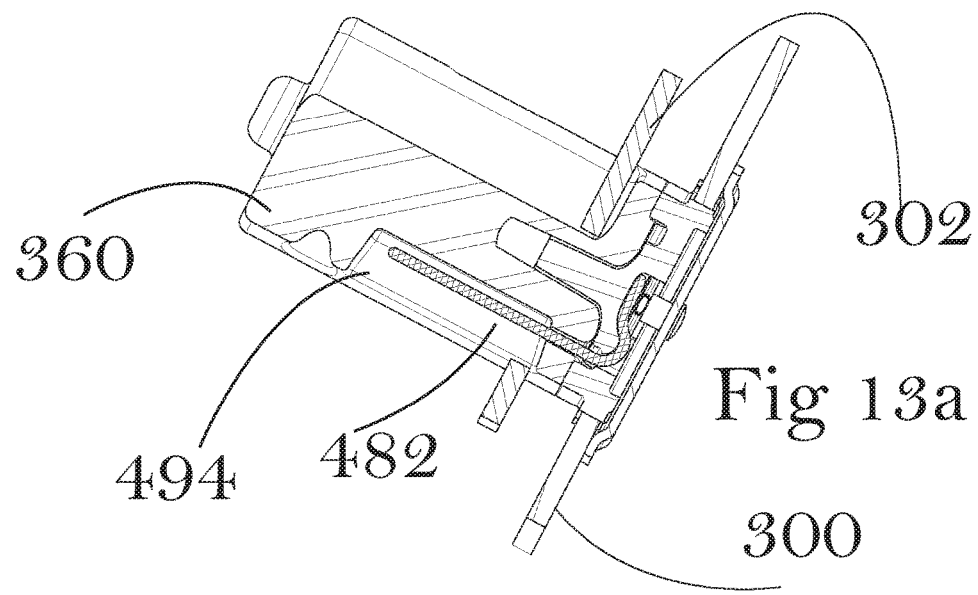

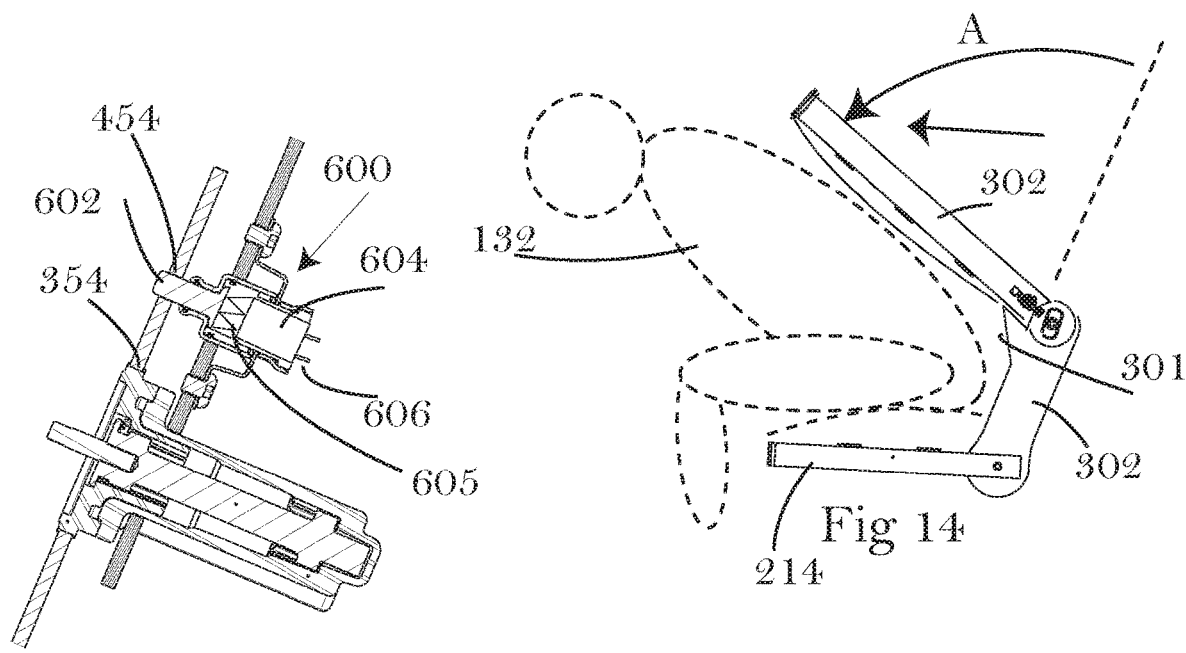
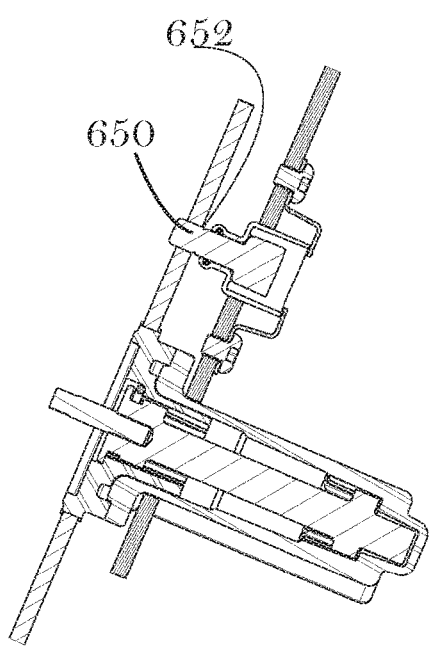
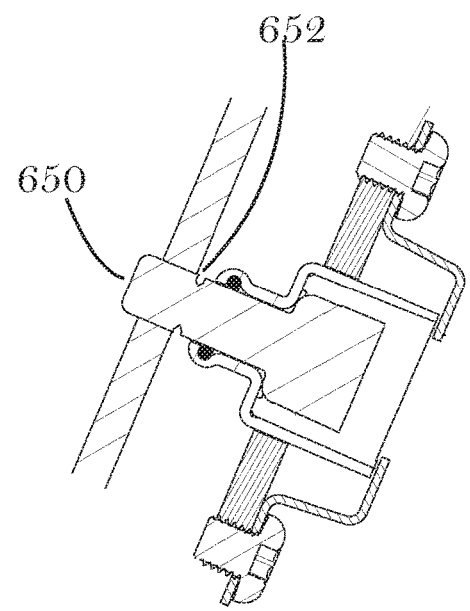

SEAT WITH ENERGY ABSORBING SEATBACK

BACKGROUND AND SUMMARY OF THE INVENTION

The present invention is directed to a seat having a seat frame with a seat back designed to prevent injuries to a rear occupant seated behind the seat as the rear occupant moves forward into the seat back during a frontal crash of a vehicle, the seat including a seat back frame part designed to support the back of any occupant but which can rotate during a crash as a rear occupant moves forward into the seat back, the invention including at least one energy absorbing assembly to control the rotary motion of the rotating seat frame part, the rotating frame part maintained in a non-rotating state by an articulating or breakable pin which when moved or broken permits the frame part to rotate as the rear occupant engages the seat frame in response to a frontal or frontal oblique vehicular crash.

BRIEF DESCRIPTION OF THE DRAWINGS

FIG. 3 illustrates a plan view of a vehicle seat according to the present invention.

FIG. 4 illustrates a right side plan view of the seat shown in FIG. 3.

FIG. 5 illustrates a left side plan view of a seat.

FIG. 6 shows a plan view of the seat according to the present invention with the seatback in a rotated position as well as a seated occupant.

FIG. 7 is a protracted view of a seat shown in FIG. 6.

FIG. 8 shows a top part of a seat back frame in a rotated position.

FIG. 9 is an enlarged view of the frame of the present invention.

FIG. 10 is a cross-sectional view showing one of the energy absorbing mechanisms as well as a pyrotechnically operated pin puller assembly.

FIG. 11 is an enlarged view of a portion of the frame in FIG. 10.

FIG. 12 shows the pin of the pin puller assembly in a retracted position.

FIG. 13 shows a second energy absorbing mechanism using a bendable wire in greater detail.

FIG. 13a is a cross-sectional view through section X-X of FIG. 13.

FIG. 14 diagrammatically shows the operation of the present invention.

FIG. 15 shows alternate embodiments of the present invention.

FIGS. 16 and 17 illustrate the use of a shear pin.

DETAILED DESCRIPTION OF THE DRAWINGS

Figure 1:
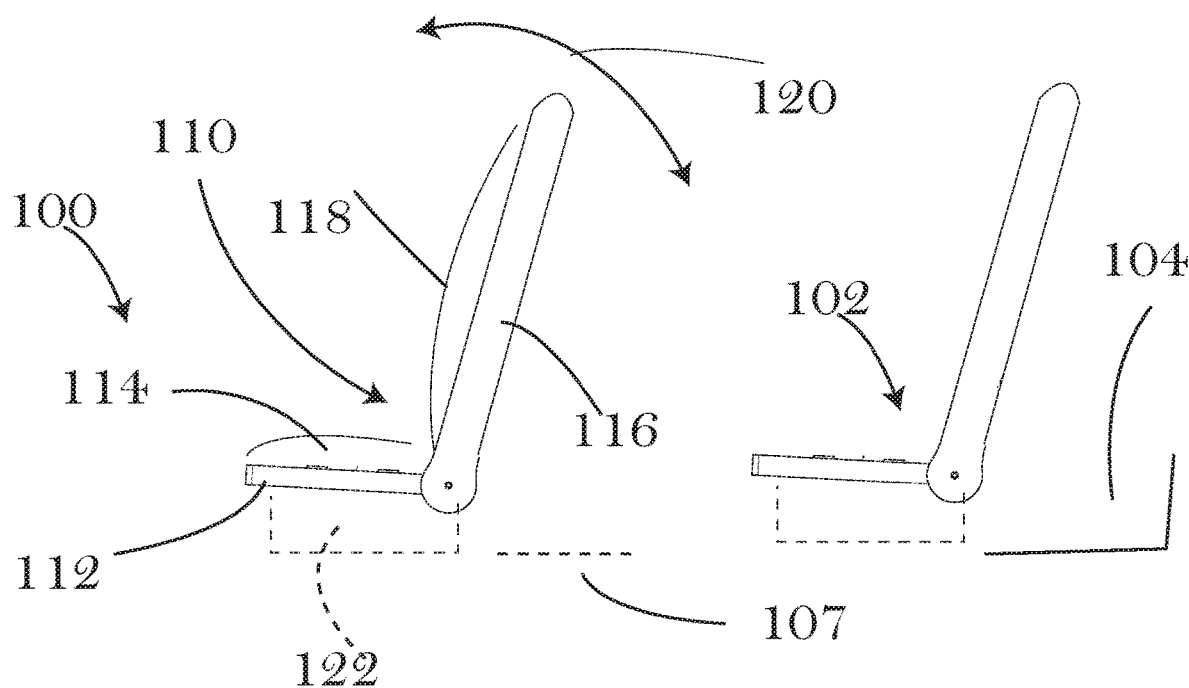
FIG. 1 shows two rows of prior art vehicle seats.
Figure 2:
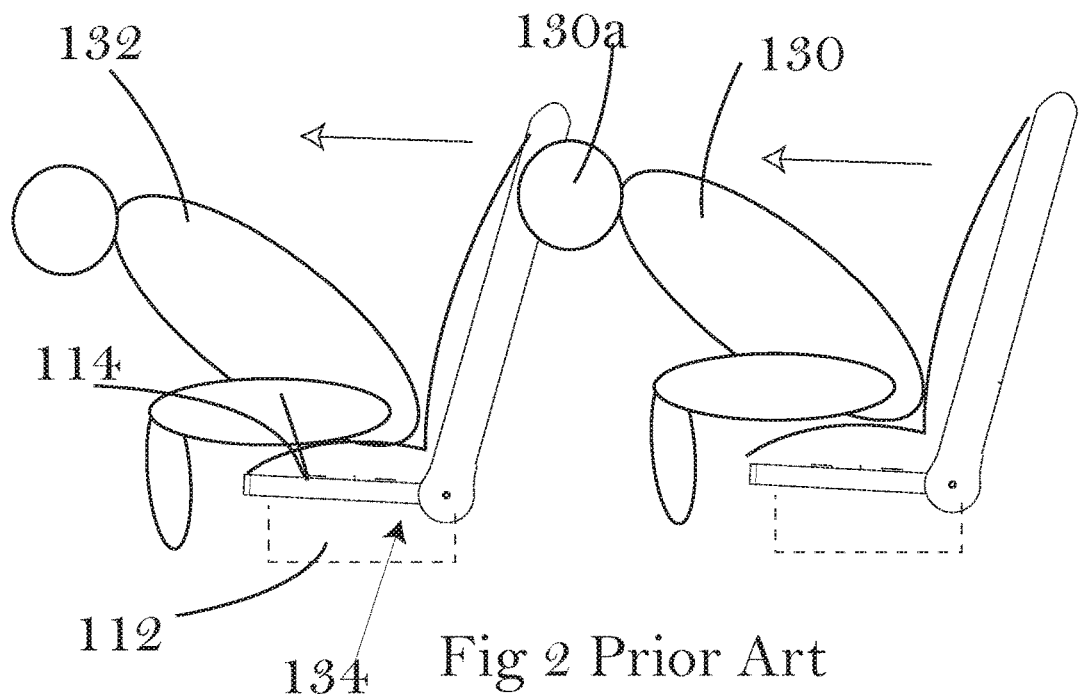
FIG. 2 diagrammatically shows a seated occupant in each of the seats shown in FIG. 1.

FIG. 1 illustrates a first seat 100 and a second seat 102 positioned behind the first seat within a vehicle 104. The vehicle may be any type of vehicle including land, air or water vehicles. Each of these seats includes a frame 110. The frame has a first part 112 to support a seat cushion 114 and of course an occupant and a second part 116 to support a seatback cushion or netting or the like 118 and the occupant's back. The second frame part 116 as is customary in the art can be rotated to many angular positions as diagrammatically illustrated by arrow 120. The frame 100 may optionally be supported by a pedestal 122 shown in dotted line; the pedestal can be supported on the floor of the vehicle as can be the seat frame. FIG. 2 illustrates a seated occupant 130 in a position rotated forwardly due to a frontal crash of the vehicle. This illustrated position also corresponds to the desired pre-crash position of the occupant in an airplane. FIG. 2 also illustrates a second occupant 132 seated in front of the occupant 130. As illustrated, the head 130a is shown impacting the seat frame part 116 of this forwardly positioned seat 134. As is known with such prior art seat frames 100, the second part 116 is rigidly locked in a pre-crash position; consequently occupant 130, if he or she is moved forward, may incur injuries to his or her head, shoulders, back, etc. upon impact with this frame. The goal of the present invention is to provide a vehicle seat that will optimally protect vehicle passengers during a particular crash.

FIGS. 3-8 illustrate various views of an improved vehicular seat 200. Seat 200 includes a frame 210 having a seat cushion frame part 212 and a seat back frame part 216. FIG. 6 illustrates frame parts 212 and 216 aligned to one another; the improved seat frame 210 can articulate, in the same manner as a prior art seat, about a rotational axis 219 to enable the seatback to move from one rotational position to another as is diagrammatically illustrated by arrow 218. FIGS. 3, 4, 5, 6, 7 and 8 show only the seat frame 210 while some of these figures also show a cushion 114, netting, or other back support material 118.

The seatback frame part 216 includes at each side of the seat a base frame part 300 secured to the seat cushion frame part 212 at the axis 219 formed by a rod 219a, as well as a rotational frame part 302 which can rotate relative to the frame part 300. A plurality of linking members 304 join the right and left handed rotational frame part 302 to stabilize the frame. These linking members can be metal, woven belting, or springs. Each pair of base frame parts 300 is joined to a corresponding rotational frame part at a rotational axis 310. As will be seen below the mechanism which adjoins the various frame parts is an energy absorbing assembly 350. As can be more clearly seen in FIGS. 6 and 8 the height, H of the base frame part 300 is chosen such that when the seatback frame part 216 is fully rotated the seatback and cushion 118 will not forcibly impact the back of the forwardly seated passenger 132.

FIG. 9 again shows further details of seat 200 and in particular the energy absorbing assembly 350. The energy absorbing assembly includes a housing 360 into which is received a torsion bar 362 which acts as a first energy absorbing mechanism; a first end 364 of the torsion bar is secured to the housing 360 by splines 366 or some other mechanism. A ratchet or pilot wheel 370 lockingly receives end 372 of the torsion bar so the ratchet wheel 370 and torsion bar 362, and more particularly end 372, can rotate in unison. Those familiar with seatbelt technology would appreciate the energy absorbing mechanism 350 as shown above is similar to an energy absorbing seat belt retractor. As can be appreciated the torsion bar provides a first energy absorbing mechanism. Assembly 350 further includes a bendable wire 480 which provides a second energy absorbing mechanism which will be discussed in further detail below.

As can be seen more clearly in FIG. 11 the top part of the base frame part 300 includes an opening 390 that is formed with a plurality of teeth 392. The lower part of the rotational frame part 302 includes an oval opening 400 sized to receive the oval shape of the housing 300. The energy absorbing assembly 350 is shown in its assembled state in FIG. 10. The housing of this assembled energy absorbing assembly is slid through opening 390 and then through opening 400. Housing part 360 will be press fit into opening 400, welded or otherwise secured in place. The pilot or lock wheel 370 with its formed teeth 372 will reside within opening 390 with the locked teeth 372 engaged with similarly formed teeth 392 of opening 390. The lock wheel can be welded or press-fit in place; alternatively the lock wheel can be captured by overlocking tabs. FIG. 9 shows one of the energy absorbing assemblies 350 fully mounted to the right side back frame part 260 of seat 200. Since frame part 302 can rotate relative to the base frame part 300 it is necessary to be able to selectively prevent this rotation. This is accomplished by inserting a pin 520 through frame parts 302 and 300. As can be seen frame part 302 includes a first opening 452 and frame part 300 includes a second low smaller opening 454.

FIGS. 9, 10 and 12 illustrate a pyrotechnically activated pin puller assembly 500 which includes pin 520. This mechanism is similar to the pin puller mechanism shown in U.S. Pat. No. 9,776,591 which is incorporated herein by reference. The mechanism 500 includes a housing 502 received within the larger opening 452. Supported within the housing 502 is a quantity of propellant 504 which is ignited by a bridge circuit 506 or similar mechanism upon receipt of a signal, see arrow 510, received from a computer or microprocessor 512. Upon activation of assembly 500 gas is produced causing pin 520 to move out of its opening 454. If we assume in the following scenario that a vehicle is involved in a forward crash its deceleration would increase dramatically which would be sensed by one or more sensors 514, causing the computer 512 to generate a signal causing the pyrotechnic material 504 ignite. Housing 502 includes a pin 520 which extends through the smaller opening 454; upon ignition of the propellant the pin as mentioned above is withdrawn into the position shown in FIG. 12. The housing 502 is secured to frame part 302 by a mounting assembly 700 including a band 702 which holds the housing in place and fasteners 704 which secure the band to frame part 302. Reference is briefly made to FIG. 8. In this high deceleration mode occupant 132 may move forwardly into the frame part 302 which is capable of rotating, and applying a relatively large force to this frame part. This force is represented in FIG. 8 by arrow 560; this arrow is also shown in FIG. 9. With the pin 520 removed from opening 452 the applied force 560 will urge the rotational frame part 302 forwardly causing the housing 362 to rotate with it. As previously mentioned the tooth wheel 370 is locked to the base frame part 360 and cannot rotate relative to frame part 302. However as the applied force 560 increases in magnitude the housing 360, which is rotationally secured to end 364 of the torsion bar 362, may begin to rotate an amount based upon the physical characteristics of the torsion bar and the applied force. In essence the torsion bar will control the rate at which the rotational frame part 302 can rotate. As previously mentioned energy absorbing assembly 350 includes a second energy absorbing mechanism in the shape of a bent wire 480. The bent wire has a top portion 481 and two legs 482.

As shown in FIG. 13, the top portion 481 is trapped between a flanged end 372a of the torsion bar and the central part 490 of the lock wheel. As shown in FIG. 13a the legs 482 of the second energy absorbing mechanism are each received within a passage 494 of the housing 360. One of these wires 482 is visibly in a slot shown in FIG. 11. As the housing 360 rotates in response to the applied force 560 the top portion 481 of wire 480 remains secured to the lock wheel. The legs become twisted as the housing rotates; this twisting action further resists the rotational motion of frame portion 302 absorbing energy as it twists and deforms further controlling the motion of the rotational frame part 302.

FIG. 14 shows a variation of the base frame part 300. In this version frame part 300 includes a protrusion 301 which extends over frame part 300, the rotary frame part 302 and which acts as a physical stop to limit the rotation of frame part 302 to a maximum fixed angle A. FIG. 15 illustrates a variation of the pin puller 500 illustrated in FIG. 10; pin puller 600 includes pin 602 and a solenoid 604 having terminals 606. A signal is received from computer or microprocessor 512; the solenoid is activated causing the pin to move against an intermediate spring 608 closer to the solenoid releasing the frame parts 300 and 302. One of the benefits of the solenoid-pin puller assembly approach is the frame parts 300 and 302 can be realigned to a locking alignment permitting pin 602 to enter opening 454. FIG. 16 is another embodiment of the invention and in this embodiment the pin puller assemblies previously discussed have been replaced by a sheer pin 650 which includes a stress enhancing mechanism 652 such as a slot manufactured in the pin so that in response to a predetermined applied force the pin will sheer without the need to activate a control mechanism, thereby eliminating the need for a computer or microprocessor to activate the movement of the pin.

Many changes and modifications in the above-described embodiment of the invention can, of course, be carried out without departing from the scope thereof. Accordingly, that scope is intended to be limited only by the scope of the appended claims.

The invention claimed is:

1. A seat having a seat frame with a seat back designed to prevent injuries to a rear occupant seated behind the seat as the rear occupant moves forward into the seat back during a frontal crash of a vehicle, the seat including a seat back frame part designed to support the back of any occupant but which can rotate during a crash as a rear occupant moves forward into the seat back, the invention including at least one energy absorbing assembly to control the rotary motion of the rotating seat frame part, the rotating frame part maintained in a non-rotating state by an axially articulating pin or breakable pin, the axially articulating pin or breakable pin having a longitudinal axis, wherein moving the axially articulating pin along the longitudinal axis or breaking the breakable pin permits the frame part to rotate as the rear occupant engages the seat frame in response to a frontal vehicular crash.

2. The seat according to claim 1 wherein the at least one energy absorbing assembly includes a first energy absorbing mechanism, wherein the first energy absorbing mechanism is a torsion bar.

3. The seat according to claim 2 wherein the at least one energy absorbing assembly includes a second energy absorbing mechanism, wherein the second energy absorbing mechanism assists the torsion bar.

* * * * *